United States Patent [19]

Thomann et al.

[11] 4,254,200
[45] Mar. 3, 1981

[54] ELECTROPHOTOGRAPHIC ELEMENT WITH BISMUTH OXIDE COMPOUND

[75] Inventors: Helmut Thomann, Munich; Christa Grabmaier, Kempfenhausen, both of Fed. Rep. of Germany

[73] Assignee: Siemens Aktiengesellschaft, Berlin & Munich, Fed. Rep. of Germany

[21] Appl. No.: 16,830

[22] Filed: Mar. 2, 1979

Related U.S. Application Data

[62] Division of Ser. No. 837,197, Sep. 28, 1977.

[30] Foreign Application Priority Data

Sep. 30, 1976 [DE] Fed. Rep. of Germany ....... 2644168

[51] Int. Cl.³ ................. G03G 5/082; B05D 5/12; C01G 29/00
[52] U.S. Cl. ................. 430/84; 430/136; 427/74; 427/376.2; 252/501.1; 252/62.3 ZB; 423/326; 423/598; 423/600; 423/617; 423/618; 423/624; 423/625
[58] Field of Search ....... 96/1.5 R; 252/501, 62.3 ZB, 252/501.1; 430/84; 427/74; 423/617

[56] References Cited

U.S. PATENT DOCUMENTS

| | | | |
|---|---|---|---|
| 2,862,815 | 12/1958 | Sugarman et al. | 96/1.5 R |
| 3,470,100 | 9/1969 | Ballman | 252/501 X |
| 3,507,646 | 4/1970 | Wood et al. | 96/1.5 R |
| 3,754,965 | 8/1973 | Mooney | 96/1.5 R |
| 3,830,648 | 8/1974 | Rutherford et al. | 96/1.5 R |
| 3,936,397 | 2/1976 | Rapp | 252/62.3 ZB X |

*Primary Examiner*—Roland E. Martin, Jr.
*Attorney, Agent, or Firm*—Hill, Van Santen, Steadman, Chiara & Simpson

[57] ABSTRACT

X-rays or γ-rays are detected by irradiating a beam of high energy radiation onto a crystalline bismuth oxide compound having the formula $Bi_{10-14}X_1O_n$ wherein X is at least one element selected from the group consisting of Al, Ga, Ge, Si and Ti and n is a numeral substantially equal to the stoichiometric amount of oxygen within the compound. The above bismuth oxide crystalline compound may be placed in a radiation dosimeter or be applied as a radiation-sensitive coating on a cylinder or plate of an apparatus for producing electrostatic copies (i.e., an in a xerographic process or the like).

7 Claims, 5 Drawing Figures

ELECTROPHOTOGRAPHIC ELEMENT WITH BISMUTH OXIDE COMPOUND

This is a division of application Ser. No. 837,197, filed Sept. 28, 1977.

BACKGROUND OF THE INVENTION

1. Field of the Invention

The invention relates to a novel method of detecting certain radiant energy, such as X-rays or γ-rays and somewhat more particularly to a method of detecting such energy via a crystalline bismuth oxide compound.

2. Prior Art

Bismuth oxide compounds containing small amounts of other oxide additives are known, for example, from "Journal of Research of the National Bureau of Standards - A. Physics and Chemistry", Vol. 28A, No. 2, March-April 1964, pages 197–206. This publication discloses processes for preparing various bismuth oxide compounds.

Further, $Bi_{12}GeO_{20}$ and $Bi_{12}SiO_{20}$ monocrystals have been grown for a considerable length of time since these monocrystals have good piezoelectric properties. It has also been pointed out in "Journal of Crystal Growth", Vol. 1, 1967, pages 37–40, that the bismuth oxide monocrystals have photoconductivity properties (which can be easily seen from the color of the monocrystals) in the wavelength range of about 0.5 to 7 μm, with the usual drop in sensitivity for the photoconductivity effect with shorter wavelengths.

SUMMARY OF THE INVENTION

The invention provides a method of detecting X-rays, γ-rays and other like radiant energy via per se known bismuth oxide compounds having the formula $Bi_{10-14}X_1O_n$ wherein X is at least one element selected from the group consisting of Al, Ga, Ge, Si and Ti and n is a numeral substantially equal to the stoichiometric amount of oxygen within the compound. The foregoing bismuth oxide compounds may be produced as monocrystals and incorporated within a radiation dosimeter. In other embodiments of the invention, the foregoing bismuth oxide compounds may be utilized in a polycrystalline or sintered form as a layer on a plate or cylinder in a xerographic process for producing electrostatic copies of an electrically charged image.

DESCRIPTION OF THE PREFERRED EMBODIMENTS

Figure 1:
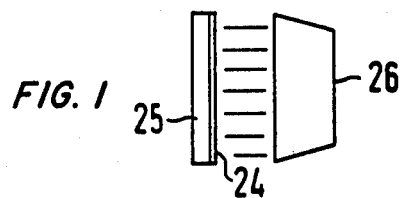
FIG. 1 through FIG. 5 are sequential schematic views of a plurality of steps practiced in accordance with the principles of the invention in an X-ray xerographic process.

The invention provides a novel method of detecting relatively high energy radiation, such as X-rays, γ-rays and other like short wavelength radiant energy.

In accordance with the principles of the invention, X-rays, γ-rays and other like radiant energy is detected by irradiating a beam of such radiant energy onto a crystalline bismuth oxide compound having the formula:

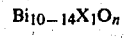

wherein X is at least one element selected from the group consisting of Al, Ga, Ge, Si and Ti and n is a numeral substantially equal to the stoichiometric oxygen content of the compound.

In accordance with the principles of the invention, bismuth oxide compounds having the foregoing formulation are utilized to detect radiant energy in a wavelength range which is entirely distinct and different from those utilized in producing photoconductivity.

A feature of the invention that is particularly striking is the extremely high quantum yield occurring; for example, with an X-ray wavelength range of X-radiation at around 78 kV and at a given exposure of 8.5 mR, filtered through a 4mm aluminum plate and a 6 mm copper plate, we obtained, in an exemplary embodiment of the invention, a quantum yield having a value of 3000 with a monocrystalline specimen of the above bismuth oxide compound. It was established that the energy absorption in the above exemplary embodiment amounted to 67% for a 0.3 mm thick specimen of the above bismuth oxide compound.

The electrical conductivity of the above described bismuth oxide compounds, which occur during irradiation thereof with X-rays and/or γ-rays, lies in the range which is technically favorable for handling. The dark resistance, which must be considered in contrast and which is about $10^{12}$ to $10^{14}$ ohm. cm, is likewise extremely favorable and yields dark drop times (i.e., the amount of time required to drop an electrical charge to $e^{-1}$) in the order of more than 7 minutes. In this regard, it should be noted that the dark drop times, which may, in fact, be greater than 7 minutes, depends considerably on any preliminary treatment and any preliminary coating associated with the crystalline bismuth oxide compound above described. For example, e dark drop times of up to 4 hours have been measured. In such instances, a preceding exposure to light appears to have substantial influence on the length of the dark drop time obtained. Further, electrodes arranged on a body or crystal composed of the above described bismuth oxide compounds also influences properties of such a crystal. Considered on the whole, however, these influences provide no meaningful disadvantages to the method of the invention because the minimum dark drop times achieved are of relatively high value.

In preferred embodiments of the invention, crystals of the above described bismuth oxide compounds are utilized to detect X-rays and/or γ-rays via X-ray and/or γ-ray dosimeters and/or in X-ray xerographic processes. The term "xerography" is already in general use and is understood as comprising a process producing at least one copy of an electrostatically charged image on a foil or carrier, i.e., a sheet of paper, for example see R. M. Schaffert, *Electrophotography*, pages 191–201 (The Focal Press, London and New York, 1975) and/or U.S. Pat. No. 2,711,481. X-ray xerograhy in the context of the invention refers to a xerographic process utilizing X-rays to photostat an original object irradiated with X-rays.

In general terms, the invention provides a method of detecting relatively high energy radiation by irradiating a beam of X-rays, γ-rays or other relatively short wavelength radiation onto a crystalline bismuth oxide compound having the above described formula and then sensing such radiation.

In one exemplary embodiment of the invention, a body, such as a monocrystal composed of the above described bismuth oxide compound is suitably charged with an electrical field, irradiated with, for example, X-rays and any change in the electrical field is measured as a gauge of the intensity of the X-rays. In another exemplary embodiment of the invention, a body composed of the above described bismuth oxide compound is suitably charged with an electrical field; irradiated with, for example, X-rays; provided with a toner powder which adheres to the surface of the body in accordance with the charge image stored therein and a photostatic copy of such image is attained on a carrier. The charge on the body may be then removed to render it receptive for the repetition of this process.

In an exemplary embodiment of the invention, the above described bismuth oxide compounds are utilized in the earlier described xerographic process for producing "copies" of an X-ray image. A number of processes are known which detach an original X-ray photograph via a film which is exposed to X-rays and subsequently developed and fixed. Apart from conventional X-ray screens which provide purely instantaneous observation, various types of X-ray image storage processes have been proposed. The invention provides an improved process for storing an X-ray image.

In accordance with the principles of the invention, X-ray images are stored by projecting an irradiation image which was previously produced by X-rays of an appropriate wavelength of a patient or a workpiece being investigated onto a plate positioned at the location of a normally positioned X-ray fluorescent screen. Such a plate, which may be a metal carrier, is provided with a layer composed of a crystalline bismuth oxide compound having the formula:

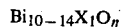

$$Bi_{10-14}X_1O_n$$

wherein X is at least one element selected from the group consisting of Al, Ga, Ge, Si and Ti and n is a numeral substantially equal to the stoichiometric amount of oxygen within the compound. In an exemplary working embodiment, a layer composed of $Bi_{12}GeO_{20}$ and having a thickness of 0.3 mm was utilized. A plate having a crystalline bismuth oxide compound layer of the type described thereon is somewhat analogous to the well known drum having a selenium coated outer surface.

An embodiment of a method of producing electrostatic copies of an electrically charged image is sequentially illustrated in a step-by-step fashion at FIG. 1 through FIG. 5.

In the process, at FIG. 1, a layer 24 composed of a bismuth oxide compound described earlier is provided onto a metallic conductive carrier member or plate 25. While numerous processes may be utilized to provide layer 24 on a carrier or plate, at least the hereinafter described processes are especially suitable.

One process for providing a crystalline bismuth oxide layer onto a conductive carrier comprises attaining a select bismuth oxide compound (in a per se known manner), for example, $Bi_{12}GeO_{20}$; $Bi_{12}SiO_{20}$ or $Bi_{10-14}X'_1O_n$ wherein X' is Ge, Si or $Ge_x-Si_y$ and x and y are numerals whose sum is equal to one, while n is a numeral substantially equal to the stoichiometric amount of oxygen within the compound, in a polycrystalline form and applying the same to a metal carrier, such as a platinum-coated metal plate via conventional vapor deposition or sputtering techniques. Thereafter, the so-applied polycrystalline bismuth oxide layer is sintered onto the surface of the plate so that the crystallites of the bismuth oxide compound form a mechanical bond (somewhat similar to that obtained with sintered ceramic materials) with one another and with the surface of the plate. The sintering process may be conducted in air or in another suitable oxidizing atmosphere at an elevated temperature, for example, in the instance of $Bi_{12}GeO_{20}$, at a temperature in the range of about 800° to 900° C.

Another process for producing a crystalline bismuth oxide layer on a carrier comprises producing a suitably thick layer of a pulverized bismuth oxide compound material, as by casting or doctor blading and sintering such layer in a manner described above. Production processes of this type are known, for example, in the production of ceramic foils composed of, for example, $Al_2O_3$. In one embodiment of this feature of the invention, a crystalline bismuth oxide compound having the earlier described formula is melted, the melt is then solidified and pulverized into substantially uniform sized granules. The granules are then sintered at an elevated temperature in an oxidizing atmosphere. If desired, a flux material, for example, comprised of $Bi_2O_3$ may be added to the pulverized granules prior to sintering. Further, the pulverized granules may be shaped into a layer, as by casting and doctor blading prior to sintering of the layer. The so-attained sintered layer is then applied onto an electrically conductive carrier, for example, comprising an aluminum plate, which functions as a mechanical support for the sintered layer.

Yet another process for producing a bismuth oxide compound layer onto a carrier surface comprises admixing pulverized polycrystalline bismuth oxide compound material with a conventional electrically conductive adhesive bonding agent and applying a relatively thin layer of this admixture onto a carrier surface. The conductivity of the bonding agent is required in order to achieve the requisite electrical conduction between the crystal granules and the carrier surface. In this embodiment, it is advisable to utilize only a minimum amount of bonding agent so that not too much of the bonding agent is present in the regions of the free (upper) surface of the layer since the individual process steps are carried out on a surface layer, which basically consists of only a select bismuth oxide compound.

Of course, instead of plate 25 as shown and described above, other carrier members may also be utilized. For example, a foil, a strip or a cylindrical drum may be utilized as in conventional xerographic processes.

After layer 24 of a bismuth oxide compound is provided onto a carrier member 25, the layer is then subjected to an electrical field, as by a conventional corona discharge known from xerographic processes. At FIG. 1, a schematic representation of a corona-producing device 26 is illustrated in the process of subjecting layer 24 to an electrical field. No further details of a corona-producing device are necessary since such devices and the associated techniques are well known. It should be mentioned, however, that the plate 25 and layer 24, after being subjected to an electrical field, are kept away from light (i.e., kept in the dark) from the time the electrical field is applied thereon to the completion of the copying process.

Figure 2:
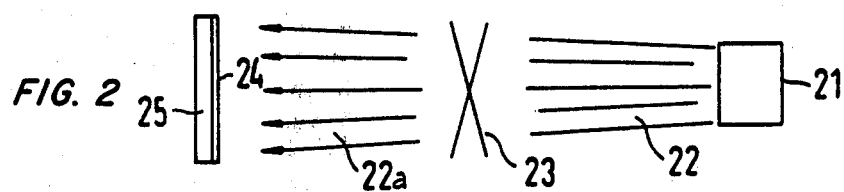

Next, as shown at FIG. 2, the electrically charged layer and plate are positioned in front of an object 23 being investigated via X-rays or the like. A suitable X-ray source 21, which produces appropriate wavelengths X-radiation 22 is provided in front of the object 23 so that a shadow image X-ray beam 22a impinges onto the free surface of layer 24 (which is composed of one of the earlier described crystalline bismuth oxide compounds), positioned on a conductive carrier member or plate 25.

Figure 3:
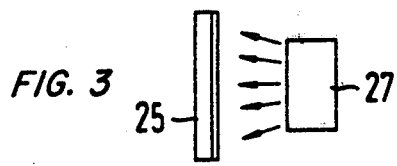
Figure 4:
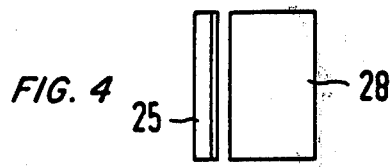

Thereafter, as shown at FIG. 3, the so-exposed free surface of layer 24 is provided, as by dusting, with a conventional toner power via means 27. As is conventional in xerographic processes, the applied toner powder adheres to the surface areas of layer 24 in accordance with the charge image stored thereon.

The charge image is formed by the discharge of localized surface regions or areas of the negative or positive charge on layer 24 (applied to layer 24 in FIG. 1 via the corona discharge process), by the shadow image X-ray beam 22a impinging on corresponding surface regions of layer 24. This occurs due to the locally disturbed electrical conductivity caused by the X-rays impinging on layer 24 (FIG. 2).

Figure 5:
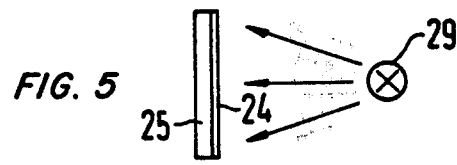

Following the application of a toner powder via means 26 (illustrated at FIG. 3), a device 28 is utilized to prepare a photostat copy of the image on plate 24 in a conventional xerographic process (illustrated at FIG. 2). After the production of a photostat copy, the charge on the free surface of layer 24 is removed or leveled, as by exposure to visible light using a light source 29 (as illustrated at FIG. 5) so as to enable the layer 24 and plate 25 to be re-employed in copying another image (i.e., so as to recycle them to the process illustrated at FIG. 1). Such a light exposure produces a uniform photoconductivity over the entire surface of layer 24, which insures a complete removal of any surface charge that may still be present (as illustrated at FIG. 5). Generally, it is recommended that the step shown at FIG. 5 be carried out even in the case of newly produced plates having layer 24 thereon, i.e., prior to the step illustrated at FIG. 1.

In FIG. 1 through FIG. 5, the process steps have been shown as being sequential, one after the other. The time interval between the commencement of the individual process steps may, however, be varied. Particularly between the steps shown at FIGS. 2 and 3 a considerable period of time may elapse, however, which cannot be greater than the dark drop time of the bismuth oxide compound utilized in order to avoid contrast loss. By following the principles of the invention as described above, copies of consecutive different images in the process step shown at FIG. 2 may be produced in rapid succession. Because of the very high degree of sensitivity of layer 24, which is composed of the earlier described crystalline bismuth oxide compounds, the integral radiation dose load can be kept relatively low even when an object being investigated is copied several times in succession.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. An X-ray and γ-ray sensitive layer positioned on a conductive carrier member for use in a device producing electrostatic copies of an electrically charged image, said X-ray and γ-ray sensitive layer comprising a polycrystalline bismuth oxide compound having the formula:

$$Bi_{10-14}X_1O_n$$

wherein X is at least one element selected from the group consisting of Al, Ga, Ge, Si and Ti and n is a numeral substantially equal to the stoichiometric amount of oxygen within the compound.

2. An X-ray and γ-ray sensitive layer as defined in claim 1 wherein said polycrystalline bismuth oxide compound is in a sintered state.

3. An X-ray and γ-ray-sensitive layer sensitive layer as defined in claim 1 wherein said layer is an admixture of said polycrystalline bismuth oxide compound and an electrically conductive bonding agent.

4. A process for producing an X-ray and γ-ray-sensitive layer on a conductive carrier member used in a device for producing electrostatic copies of an electrically charged image comprising:

melting a crystalline bismuth oxide compound having the formula:

$$Bi_{10-14}X_1O_n$$

wherein X is at least one element selected from the group consisting of Al, Ga, Ge, Si and Ti and n is a numeral substantially equal to the stoichiometric amount of oxygen within the compound;

solidifying the melt of said compound and pulverizing the same into substantially uniformly sized granules; and sintering said granules at an elevated temperature in an oxidizing atmosphere.

5. A process as defined in claim 4 wherein a flux material comprised of $Bi_2O_3$ is added to the pulverized granules prior to sintering.

6. A process as defined in claim 4 wherein the pulverized granules are shaped into a layer and said layer is sintered.

7. A process as defined in claim 6 wherein the pulverized granules are shaped into a layer via casting and doctor blading.

* * * * *